Feb. 25, 1941.    B. MILLER    2,232,959
ELECTRIC RATE METER
Filed July 29, 1939
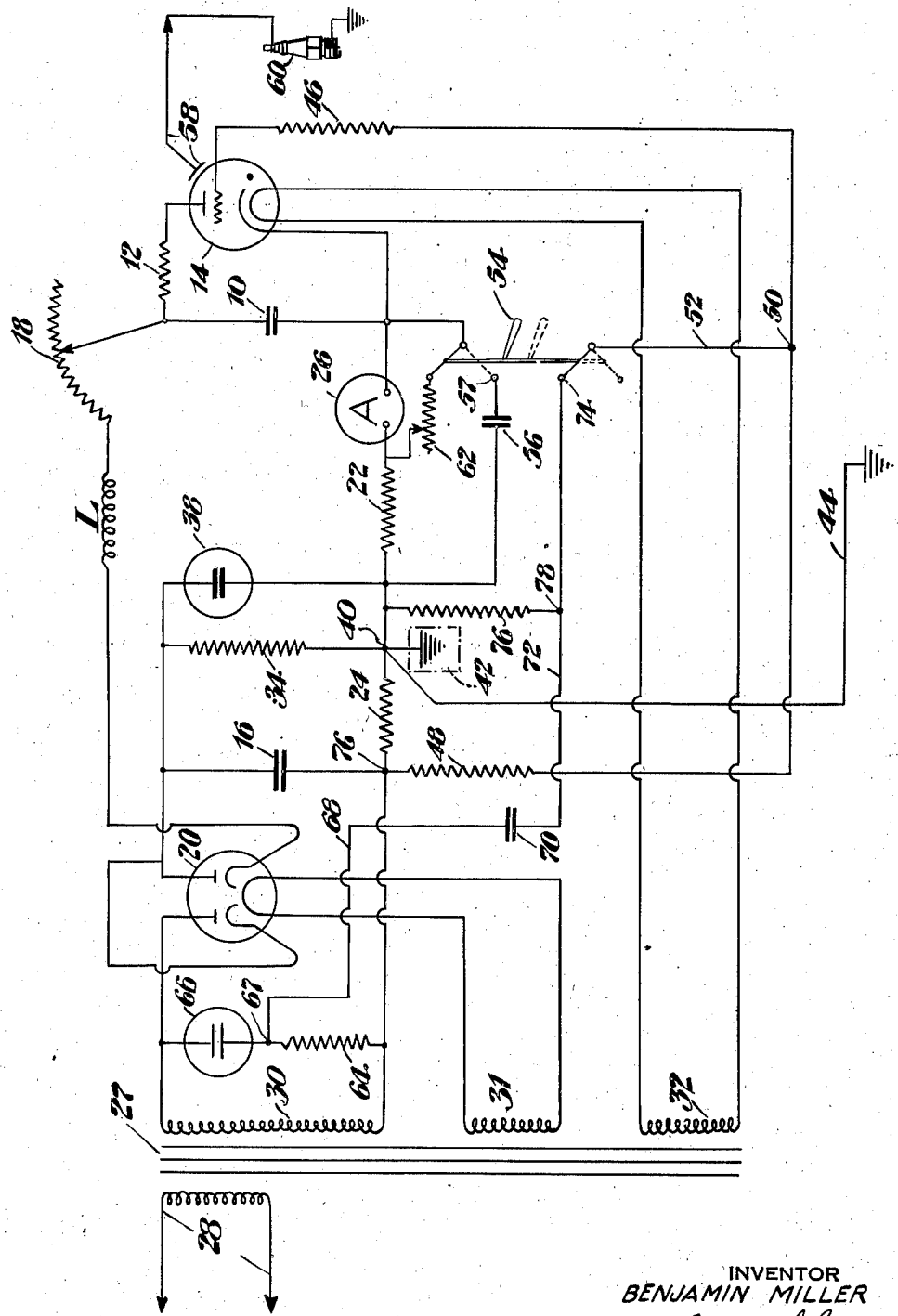
INVENTOR
BENJAMIN MILLER
BY
Edmund J. Borden
ATTORNEY Patented Feb. 25, 1941

2,232,959

UNITED STATES PATENT OFFICE 2,232,959

ELECTRIC RATE METER

Benjamin Miller, Richmond Hill, N. Y., assignor, by mesne assignments, to Cities Service Oil Company, New York, N. Y., a corporation of Pennsylvania Application July 29, 1939, Serial No. 287,251

6 Claims. (Cl. 175—183)

This invention relates generally to electric rate meters. The primary object is to provide improved apparatus adapted for measuring the speed of a variable speed spark ignition engine.

One type of known rate meter adapted for measuring the speed of a spark ignition engine comprises essentially an electric condenser, a trigger tube through which the condenser may be charged or discharged, a conductor or third electrode positioned near the cathode of the trigger tube and connected to the ignition circuit of the engine so that the ignition impulses of the engine may serve as stimuli to initiate flow of electricity in pulses through the trigger tube, and an ammeter for measuring the current flowing.

Since the trigger tube is rendered conductive by each ignition impulse delivered to that spark plug of the engine to which it is operatively connected, and since the number of ignition impulses is directly proportional to the speed at which the engine is driven, the ammeter may be calibrated to indicate the speed of the engine, providing that the quantity of electricity which passes through the trigger tube at each impulse is a constant. The term "trigger tube" designates a gaseous conductor device in which conduction of current through a gaseous medium between two primary electrodes is initiated by applying the proper stimulus, as for example by changing the potential of a third electrode.

Current flowing into and out of a condenser in such a rate meter is given by the following formula:

(1) $I = NE_cC$; in which $I$ = the number of amperes flowing;

$N$ = the number of charges and discharges per second;

$E_c$ = the number of volts change in potential of the condenser between discharged and charged states; and $C$ = the number of farads in capacity of condenser.

The ammeter used measures I, but may be calibrated in terms of $N$ if $E_c$ and $C$ remain constant. With equipment which is commercially available at reasonable cost neither $E_c$ nor $C$ remain absolutely constant, so that the calibration of an ammeter in terms of engine speed is not permanent.

Another object of the invention is therefore to provide apparatus of the type referred to which is economical to build and reliable in service, and in which provision is made for easily checking and recalibrating the instrument to take care of any changes in the characteristics of any of the elements thereof during use. A feature of the present invention resides in the use of an A. C. power supply for the instrument; the frequency of such power supply being used as the standard in recalibration.

With the above and other objects and features in view, the invention consists in the improved speed indicating apparatus which is hereinafter described and particularly defined in the accompanying claims.

The invention will be hereinafter more particularly described by reference to the accompanying drawing, which is a wiring diagram of a condenser discharge trigger tube rate meter having an oscillating condenser charging circuit including an electric check valve and an ammeter for measuring current flow through the trigger tube, together with an improved calibrating circuit including switching mechanism and a variable resistance whereby the rate meter may be checked at any time against a standard rate to take care of variations in characteristics of its several elements during use.

The rate meter which is illustrated embodies a condenser 10 which may be a 0.75 microfarad condenser. The discharge circuit of condenser 10 includes a fixed resistor 12 which may be 500 ohms, and a trigger tube 14 which may be a type 885 hot cathode argon filled grid controlled rectifier. The charging circuit for condenser 10 includes a reservoir condenser 16 which may be of 16 microfarads capacity, an inductance L which may be of 25 henries, and a variable resistance 18 which may have a maximum resistance of 10,000 ohms. The charging circuit of condenser 10 also includes an electric check valve 20 which is illustrated in the drawing as comprising half of a double hot cathode rectifier tube, preferably of the type "25—Z—5" or equivalent. The charging circuit of flashing condenser 10 also includes a fixed resistance 22 which may have a value of 500 ohms, a fixed resistance 24 which may have a value of 2500 ohms, and an ammeter 26 which may have a full scale reading of one milliampere.

The means for charging reservoir condenser 16 includes a transformer 27 which is energized from alternating current supply 28 of, for example, 117 volt 60 cycle current. Transformer 27 is shown as provided with three secondary windings 30, 31 and 32. It is the secondary winding 30 of transformer 27 (carrying, for example, 140 volts) which, together with the other or lefthand side of double rectifier tube 20, as viewed in the diagram, make up the primary energizing elements in the charging circuit of condenser 16. The negative end of the condenser 16 is connected through resistance 24 to ground. The positive end of condenser 16 is connected through a resistance 34 (of, for example, 10,000 ohms) to ground. The positive end of condenser 16 is also connected through a glow tube 38 to ground. Tube 38 may preferably be a small neon lamp of about 2 to 3 watts capacity without base resistor. Lamp 38 is thus connected in parallel with resistance 34. The function of resistance 34 is to maintain direct current flow through resistance 24 during the period in which the potential across condenser 16 is being built up to the starting voltage for tube 38. After being lit, tube 38 is designed to maintain a substantially constant potential of, for example, 65 volts, and it is this constant source of D. C. potential maintained by tube 38 from which the condenser 10 is charged. Resistance 24 takes up any changes in potential across reservoir condenser 16. The current through resistance 34 remains constant, and the current through tube 38 varies more than the current through resistance 24. It will be understood that the constancy of potential of tube 38 is a first approximation, this voltage varying somewhat with each individual tube unit and with the amount of current flow through the tube and the age of the tube.

Winding 31 of transformer 27 is connected to the cathode heating element of tube 20. Winding 32 of transformer 27 is connected to the cathode heating element of flashing tube 14. A point 40, at which one end of resistance 24 is connected both to resistance 34 and to tube 38, is grounded to the instrument case 42, and also by a lead 44 to the grounded frame or other metal support on which the engine under test is mounted.

The grid of tube 14 is connected to the negative terminal of condenser 16 through resistances 46 and 48, in series. 46 may be a 10,000 ohms resistance, and 48 a resistance of 200,000 ohms. The junction point of resistances 46 and 48 is at 50. Point 50 is connected by a lead 52 to one end of one of the blades of a double-pole double-throw switch 54. The other blade of switch 54 is connected to the positive terminal of ammeter 26. A damping condenser 56 (which may have a capacity of 1500 microfarads) has its negative terminal grounded and its positive terminal connected to a fixed contact 57 of switch 54.

In using this instrument for measuring the engine speed of automobile engines with switch 54 in the position illustrated by dotted lines, conductor 58, which leads to an electrode mounted near tube 14, is connected to the center electrode of a spark plug 60. When an ignition impulse is delivered by the ignition system of the engine to spark plug 60, conductor 58 transmits a stimulus to trigger tube 14 causing the trigger tube to become conductive. Condenser 10 then discharges through the trigger tube. After condenser 10 has been discharged through trigger tube 14 it is recharged from reservoir condenser 16 and is then ready to discharge again the next time an ignition impulse is delivered from the ignition system to the spark plug 60. The amount of current flowing through the tube 14 is indicated by ammeter 26.

The ammeter reading corresponding to any ignition impulse rate, and therefore to any engine speed, may be calibrated by means of Formula 1, but it is preferable to recalibrate ammeter 26 in impulses per second or revolutions per minute by direct determination, since neither $E_c$ nor C can be so readily determined and they are not absolutely constant. Also $E_c$ is not conveniently determined. It is a product of the difference between the approximately constant potential $E'$ across tube 38 and that potential $E''$ which is characteristic of tube 14 when it is carrying current, and a factor K, in the following formula:

(2) $$E_c = K(E' - E'')$$

Ordinarily K in Formula 2 is equal to one, but as previously explained, the flashing condenser charging circuit is oscillatory, and it is characteristic of an oscillating charging circuit that the condenser potential reaches a maximum value greater than the source potential, thus making it possible in this type of charging circuit for K to be greater than 1. The electric check valve 20 traps the overcharge, so that the condenser 10 retains this maximum potential until it is discharged. By controlling the ratio of resistance to inductance in the charging circuit the value of K may be controlled. By including a variable resistance 18 in the condenser charging circuit K may be varied over a range of nearly 2:1. Thus the meter reading for any impulse rate may be varied over a range of nearly 2:1 by the variable resistance 18. The ammeter reading is also dependent on the sensitivity of ammeter 26, and this sensitivity may be in effect decreased by shunting the ammeter by a resistance such as 62. Having two means of changing the meter reading, it is possible to employ both means initially in calibrating the instrument, and thereafter to employ only one means in recalibrating.

In the initial calibration the first step is to throw the switch 54 into the position shown in dotted lines, and to connect conductor 58 to a source of ignition impulses of known rate, (for example 25 per second, which corresponds to 3000 R. P. M. for a fourstroke cycle engine). Resistance 18 is then adjusted to bring the needle of ammeter 26 to the point on its scale corresponding to the known impulse rate. Then conductor 58 is disengaged from the source of ignition impulses and switch 54 is thrown to the position indicated in full lines. In this position of the switch, impulses of a frequency equal to A. C. supply line frequency are impressed on the grid of tube 14 by means hereinafter described. Then resistance 62 is adjusted to bring the needle of the ammeter 26 to a reference point which is preferably full scale reading of the instrument, if the supply line frequency is greater than the highest impulse rate for which the instrument is designed. Resistance 62 is hereafter maintained at this adjustment, and switch 54 is then thrown back to the dotted line position for use.

The calibration of the instrument may be checked at any time by throwing switch 54 to the indicated full line position and observing whether or not the needle of the ammeter comes to the reference point. If not, recalibration is necessary, and is effected by means of variable resistance 18 which is varied to bring the needle to the reference point. It will be understood that conductor 58 should not be connected to a source of ignition impulses while thus checking the calibration of the instrument. The means for impressing on the grid of tube 14 impulses of the frequency of the A. C. supply line 28 when the switch 54 is in the indicated full line position, include the transformer winding 30 and across it a fixed resistance 64 (which may be of 400,000 ohms) in series with a small glow tube 66 preferably comprising a type T-4½ neon lamp of about ¼ watt capacity. From junction point 67 of tube 66 with resistance 64, wire 68 leads to a terminal of a coupling condenser 70 of, for example 0.001 microfarad. A wire 72 connects the other terminal of condenser 70 with a fixed contact 74 of switch 54. A resistance 76 (which may be of 65,000 ohms) is connected to wire 72 at point 78. The other end of resistance 76 is grounded.

Normally the grid of tube 14 is maintained negative with respect to the cathode by the voltage drop through resistor 24. The voltage drop through 24 is considerably greater than the bias required to maintain tube 14 in a non-conducting state with the highest operating potential across condenser 10. This excess bias is necessary for stability, because if the bias is reduced to a value which is just slightly above that required to maintain tube 14 in a non-conducting state there is danger that the tube will be rendered conductive by ignition impulses delivered to spark plugs of the engine other than plug 60 to which conductor 58 is attached.

The triggering of tube 14 by the A. C. supply line 28 may be accomplished by periodically superimposing on the negative bias, which is the drop through resistor 24, a positive voltage sufficient to bring the net bias below that necessary to maintain tube 14 in a non-conducting state. Ordinarily this may be accomplished by coupling the grid of tube 14 to the A. C. supply line through a transformer or condenser. However, it has been found that such a method is unsatisfactory when the instrument must be used on power supplies the voltage of which varies over a wide range (say 100-130 volts for an instrument the nominal rating of which is 115 volts), because at some supply voltage the grid of tube 14 may go positive and draw current, thereby giving false readings of the ammeter. In order to function properly the excitation applied to the grid of tube 14 should be impulsive rather than sinusoidal. Such impulsive excitation is provided by the means herein employed.

As the potential across winding 30 of the transformer increases from zero in either direction, no current flows through lamp 66 until the potential has risen to the breakdown potential of lamp 66. When lamp 66 starts to conduct there is a sudden change in the potential drop across it, which change is transmitted through condenser 70 to point 78, and also to the grid of tube 14 when switch 54 is in its indicated full line position. Impulses of alternately positive and negative polarity with respect to the cathode of tube 14 are thus impressed on the grid, and the positive impulses may cause the tube to flash if they reduce sufficiently the negative bias.

The magnitude of the impulse is only about 35 volts with the usual type of neon glow tube 66, and only a portion of this voltage is available at the grid. The voltage swing available at the grid is not sufficient when the drop across resistor 24 is the bias, and it is therefore arranged so that the steady grid bias is reduced when switch 54 is in full line position. As may be seen on the diagram, resistor 24 is shunted by the voltage divider formed by resistances 48 and 76 in series when switch 54 is in full line position, and the steady bias is thereby reduced to the drop across resistor 76. Resistances 76 and 48 are proportioned so that the potential drop across 76 is sufficient to maintain the flashing tube 14 in the non-conducting state until a positive impulse is transmitted to point 78 through condenser 70.

Since the impulses transmitted through condenser 70 are very short in duration (condenser 70 is of very low capacity so that it has a high impedance for the A. C. supply frequency) no appreciable error is caused even if the grid does swing positive, since the quantity of electricity which can flow during the very short interval is negligible.

The magnitude of resistance 62 is determined in the first instance by the frequency of the A. C. supply and the full scale reading which the instrument 26 should have. For example, if the full scale reading of the instrument is to be 25 impulses per second, and the supply line frequency is 60 per second, then the magnitude of resistance 62 should be approximately $$\frac{60-25}{25} \times \text{the resistance of the ammeter}$$

This ratio will not be exactly that just given, because condenser 10 is discharged further when the grid bias is low than when it is high. It is therefore preferable to make resistance 62 adjustable and to adjust it in the manner mentioned above.

If the supply line frequency is less than the full scale impulse rate, the switching arrangement just described may be changed so as to shunt the meter when the instrument is being used to measure engine speed, and to disconnect the shunt when checking and recalibrating. In this case the initial calibration procedure must be changed in that the first step is with supply line excitation.

All of the above description has been based on using full scale reading of the ammeter 26 as the reference point, and this is generally preferable. However, it is possible to use some part scale reading as the reference point.

The current flowing into the condenser 10 consists of a series of impulses which are separated by intervals of no current flow. Each discharge of condenser 10 causes a current impulse of the same kind, and the less frequent the condenser discharges, the longer are the intervals between the current impulses. When the intervals become very long,—that is at low discharge rates, the needle of the ammeter 26 tends to vibrate. The primary purpose of resistance 22 and condenser 56 is to reduce this tendency. As shown, condenser 56 is not in circuit with the ammeter when checking or recalibrating, as it is not needed for impulse rates higher than about 16 per second.

By the invention described, the rate meter may be developed of standard low cost parts, calibrating may be done in the laboratory quickly and easily, and in the field the instrument may be compensated quickly and easily for changes in characteristics of its elements.

The invention having been thus described, what is claimed as new is:

1. In the combination including a negative grid trigger tube and a power supply of regulated voltage comprising an A. C. source, a rectifier, a reservoir condenser, a voltage regulating glow tube and a resistance connected between the negative terminal of the reservoir condenser and the cathode of the glow tube, the voltage drop across said resistance providing the grid bias for said trigger tube, the improvement which comprises a second resistance shunted across said voltage regulating glow tube whereby a negative bias is provided for the trigger tube during the period in which the reservoir condenser is charging to the breakdown potential of the glow tube.

2. In an electric rate meter comprising a condenser, a charging circuit and a discharging circuit for the condenser, a trigger tube in one of said circuits having at least one triggering electrode, an ammeter for indicating the current flowing through said trigger tube, and means for connecting a triggering electrode to a source of impulses the rate of which is to be measured, the improvement comprising a source of impulses of standard frequency, coupling means including a switch for impressing said impulses of standard frequency on a triggering electrode of the tube during calibration, and means under the control of said switch for changing the relation between the ammeter reading and the impulse rate.

3. In an electric rate meter comprising a condenser, a charging circuit and a discharging circuit for the condenser, a trigger tube in one end of said circuits having at least two triggering electrodes, an ammeter for indicating the current flowing through said trigger tube, means for connecting one triggering electrode to a source of impulses the rate of which is to be measured, a source of impulses of standard frequency, and coupling means including a switch for impressing said impulses of standard frequency on a second triggering electrode of the tube during calibration.

4. In an electric rate meter comprising a condenser, a charging circuit and a discharging circuit for the condenser, a trigger tube in one of said circuits having at least one triggering electrode, an ammeter for indicating the current flowing through said trigger tube, and means for connecting a triggering electrode to a source of impulses the rate of which is to be measured, a source of impulses of standard frequency comprising an A. C. circuit of standard frequency, two impedances of which at least one is a glow tube connected in series across said A. C. circuit, a switch, and means under the control of said switch whereby the sudden change in potential across the glow tube which occurs when the glow tube starts to conduct is impressed on a triggering electrode.

5. In an electric rate meter comprising a condenser, a charging circuit and a discharging circuit for the condenser, a trigger tube in one of said circuits having at least one triggering electrode, an ammeter for indicating the current flowing through said trigger tube, and means for connecting a triggering electrode to a source of impulses the rate of which is to be measured, the improvement comprising a source of impulses of standard frequency, and coupling means for impressing said impulses of standard frequency on a triggering electrode of the tube during calibration, said means including a double-blade, double-throw switch having one blade controlling the coupling connection between the source of impulses of standard frequency and a triggering electrode, and having another blade controlling the connection of a resistance in parallel with the ammeter.

6. In an electric rate meter comprising a condenser, a charging circuit and a discharging circuit for the condenser, a trigger tube in one of said circuits having at least one triggering electrode, an ammeter for indicating the current flowing through said trigger tube, means for connecting a triggering electrode to a source of impulses the rate of which is to be measured, said trigger tube being normally maintained in non-conductive state by a negative bias impressed upon said triggering electrode, said negative bias being substantially in excess of that necessary to maintain the tube in a non-conductive state in the absence of impulses from the source the rate of which is to be measured, a source of impulses of standard frequency, coupling means including a switch for impressing said impulses of standard frequency on a triggering electrode of the tube during calibration, and means under the control of said switch for reducing said negative bias to a value sufficient to maintain the tube in a non-conductive state in the absence of impulses from a source of standard frequency but not so great that the tube cannot be triggered by the source of standard frequency.

BENJAMIN MILLER.